Oct. 21, 1930.  H. PANZETTA  1,779,329
ELECTRIC CIRCUIT CONTROLLING APPARATUS
Filed June 17, 1929
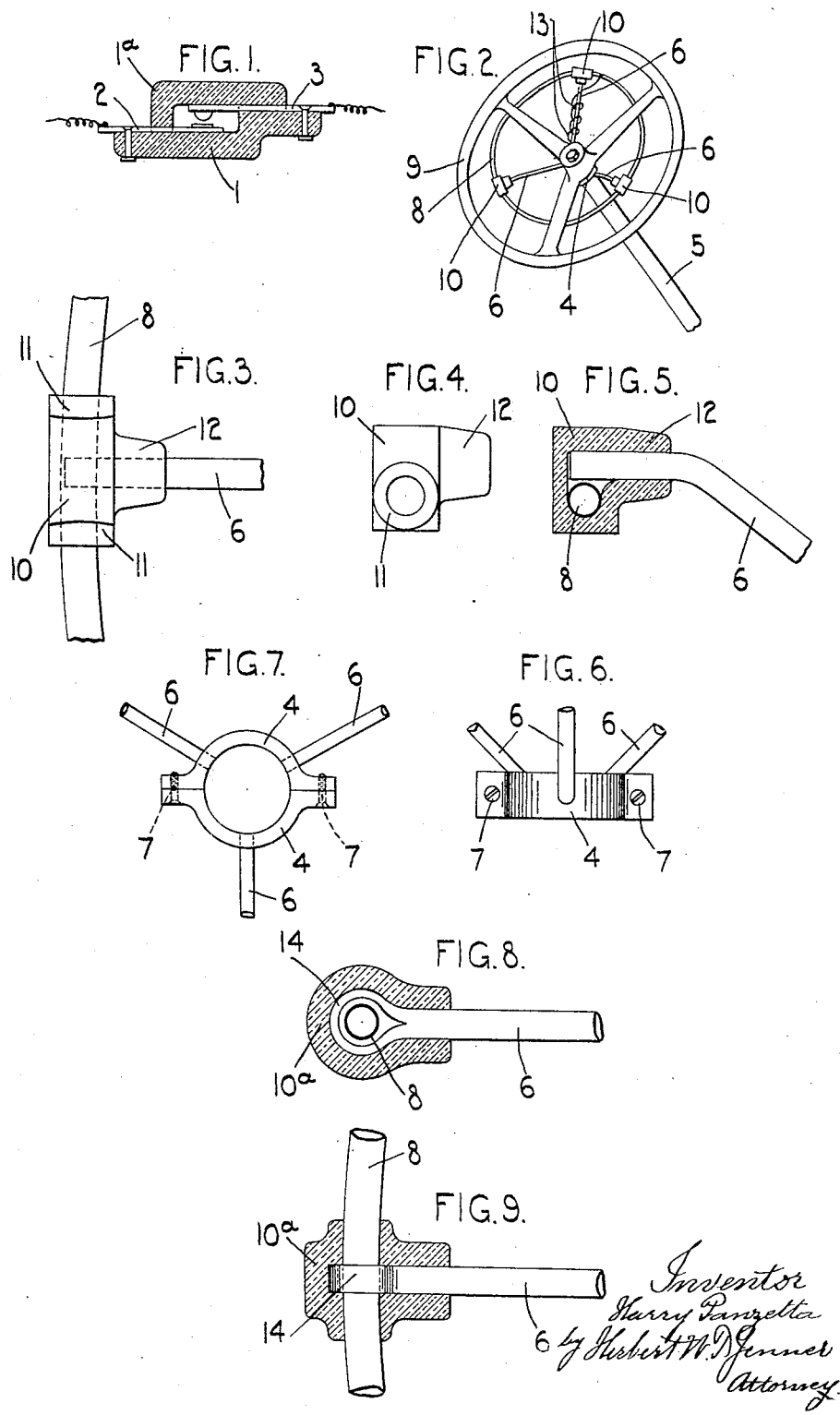
Inventor
Harry Panzetta
by Herbert W. Jenner
Attorney Patented Oct. 21, 1930

1,779,329

UNITED STATES PATENT OFFICE

HARRY PANZETTA, OF WATFORD, ENGLAND

ELECTRIC CIRCUIT-CONTROLLING APPARATUS

Application filed June 17, 1929, Serial No. 371,518, and in Great Britain June 27, 1928.

This invention relates to electric circuit controlling switches of the kind in which the switch contacts are normally held apart by an india-rubber member which is distorted when the contacts are caused to bear one on the other to close the circuit. Circuit controlling switches of this kind are frequently fitted on motor vehicles for various purposes, such, for example, as controlling the operation of an electric horn, and whilst a switch according to the present invention has been primarily devised for use on motor vehicles the invention is not restricted to such use.

The improved switch according to the invention comprises an india-rubber body within which is an internal chamber into which conductors are led in an air-tight manner through holes formed through the walls of the india-rubber body, the arrangement being such that the india-rubber body in its normal condition maintains the conductors separated from each other within the chamber but upon distortion of the india-rubber by pressure upon one or other or both conductors contact between the conductors is made within the chamber so that there cannot be any external sparking and the contacts are protected effectively against the access of moisture thereto.

In an embodiment of the improved switch in a device for controlling the horn or like circuit of a motor vehicle a fixed structure is arranged in convenient association with the rotary steering wheel of the vehicle the said structure comprising conductors in the form of a ring and spokes connected together by india-rubber switch members as above described, the arrangement being such that pressure on the ring at any part will result in the horn circuit being closed by contact of the ring with one or more of the spokes at one or more of the india-rubber switch members.

The circuit controlling apparatus according to the invention may be readily mounted on the steering column below the steering wheel without removing the latter or disassembling any of the parts mounted on or associated with the steering wheel and column, and is such that loops or festoons of wire adjacent the steering column may be avoided.

In the accompanying drawings:—

Fig. 1 shows a construction of electric switch or circuit controller constituting a simple embodiment of the invention.

Fig. 2 illustrates an embodiment of the invention constituting a controller for the circuit of an electric horn, the circuit controller being shown mounted on the steering pillar of a motor car.

Fig. 3 is a plan, drawn to a larger scale, of portions of the finger ring and one of the radial arms of the circuit controller shown in Fig. 2, and the associated india-rubber socket member.

Fig. 4 is an elevation of the socket member shown in Fig. 3.

Fig. 5 is a sectional elevation of the socket member shown in Figs. 3 and 4 with the finger ring and radial arm therein, the parts being in their normal position or condition.

Figs. 6 and 7 show in elevation and plan respectively a split collar adapted to be mounted on the steering column and carry the radial arms above referred to, and Figs. 8 and 9 illustrate modified constructions of the circuit controller according to this invention and hereinafter described.

Referring firstly to Fig. 1, the switch in this embodiment of the invention is formed by riveting or otherwise securing to a suitably shaped simple block of india-rubber 1 two members 2, 3 of conducting material the block 1 being so shaped and the members 2, 3 being so disposed that by actuating one or both of the members 2, 3 and thereby distorting the india-rubber block 1 the conducting members can be brought into contact with one another and will be returned to normal by the return of the india-rubber block to its normal shape when the operating pressure is removed from the parts. The india-rubber member comprises a part 1ª which with the block 1 encloses the contact making portions of the members 2, 3, the india-rubber member being thus a hollow block with two apertures through which the contact members 2, 3 extend and through which apertures the contact making portions of the said members 2, 3 are passed in an air-tight manner.

As the members 2, 3 fit tightly in the slots or apertures in the india-rubber member it will be appreciated that the contacting portions of the members 2, 3 are fully enclosed and protected against the access of moisture thereto and any sparking will be confined to the enclosed chamber.

Referring now to Figs. 2 to 7, inclusive, which illustrate an embodiment of the invention for use in controlling the circuit of an electric horn on a motor vehicle, a ring or collar 4 is suitably secured to the steering pillar 5 adjacent its upper end, said ring or collar 4 having three or more radially extending arms 6. The collar 4 is split diametrically and the half-collars are secured together about the pillar 5 by suitable screws 7 or by bolts, the arrangement preferably being such that in securing the parts together they are clamped tightly on the steering pillar. Associated with the outer or free ends of the radial arms 6 is a ring 8 (hereinafter called a finger ring) concentric with the steering wheel 9 and preferably at the underside thereof as shown in Fig. 2. Mounted at intervals on the said finger ring 8 are T-shaped india-rubber sockets or members 10 corresponding in number with the radial arms 6, the finger ring 8 extending through the heads 11 and the radial arms 6 extending through the legs 12 of said T-shaped members 10. The leg 12 of each member 10 is offset from its head 11 or otherwise so disposed in relation to the head, and the end of each radial arm 6 is so formed, that in the normal position of the parts the india-rubber sockets or members 10 hold the finger ring 8 out of contact with the ends of the arms 6. The portions of the ring and the end portions of the radial arms which lie within the members 10 are formed of conducting material and constitute the contact members of a series of switches. The contact making parts of the ring are electrically connected to one lead of the horn circuit and the contact making parts of the arms to the other lead of said circuit. Preferably the finger ring 8 is formed of a single portion of conducting material coated or covered between the contact making places with suitable insulating material and the radial arms 6 and split collar 4 are preferably formed of conducting material covered or coated where desired with insulating material. When so constructed a single wire 13, Fig. 2, from the finger ring may be given a few turns about one of the radial arms 6 and brought adjacent a wire from the collar 4 or one of the said arms 6, and both wires carried forward together to the desired place, thus avoiding any loop or festoon of wire adjacent the steering wheel 9. The construction is such that on the finger ring 8 being stressed at any point contact will be made between the ring and at least one of the radial arms 6 and remain made whilst the ring is stressed, the india-rubber members 10 being more or less distorted by the movement of the finger ring. On the ring 8 being relieved of pressure from the finger or fingers of the driver the india-rubber members 10 will return to their normal condition and restore the ring to its normal position in which the horn circuit is broken at all the several contact making places on the ring. The open ends of the arms 11, 12 of the T-shaped members 10 fit tightly upon the ring 8 and the radial arms 6, respectively, and by so doing prevent access of moisture and dust to the contact making parts and avoid any possibility of external sparking. It will be understood that in the construction just described the finger ring 8 is stationary on the steering column 5, rendering a loop of free wire from the ring to the column unnecessary. The finger ring 8 is split at an appropriate place so that the free ends may be sprung apart to enable the parts to be assembled, and the two free ends may be joined together in any convenient manner, but preferably in such a manner that the parts may be disassembled without difficulty when desired.

According to another embodiment of the invention shown in Figs. 8 and 9, the radial arms 6 terminate in eyes 14 through which the finger ring 8 extends with appropriate clearance. An india-rubber member 10$^a$ embraces or encloses each eye 14 and the portion of the finger ring 8 extending therethrough. The member 10$^a$ is so formed as to hold the finger ring 9 normally out of contact with the eye 14 but to permit it to be moved into contact therewith and to automatically return it to its normal position when the pressure on it is released by the operator.

Variations in constructional details may be made without departing from the invention; also the electric switch or circuit controlling device described above as for use in controlling the circuit of an electric horn may, if desired, be employed for other signalling purposes on a motor car, such for instance as controlling a "stop" indicator, or a direction of turning indicator, a finger ring and the associated fixed contact or contacts being provided for each such signal or indication. Also, if desired, press button or other contact makers may be provided on the finger-ring, for instance one at the right-hand side of the steering column and the other at the left-hand side, whereby the circuit to give a signal, for instance as to the direction of turning, may be closed by pressure of the finger on the appropriate contact maker, the pressure so exerted also moving the finger ring to close the horn circuit and sound the horn.

What I claim is:—

1. For controlling the horn or like circuit of a motor road vehicle a fixed structure in convenient association with the rotary steering wheel of the vehicle, the said structure comprising conductors in the form of a ring and spokes connected together by india-rubber housings, the arrangement being such that pressure on the ring at any part will result in the horn circuit being closed by contact of the ring with one or more of the spokes.

2. A circuit controller for controlling the circuit of an electric horn or other device on a motor vehicle comprising in combination a collar or member adapted to be secured to the steering pillar adjacent its upper end below the steering wheel, radial arms extending from said collar or member, a finger ring adapted to be disposed below the steering wheel and adjacent thereto, and india-rubber housings adapted to hold the finger ring normally out of contact with the end portions of the radial arms but to permit it to be moved into contact with one or more of said radial arms to close the circuit, and to restore the ring automatically to its normal or circuit breaking position when released by the driver of the car.

3. For controlling the horn or like circuit of a motor road vehicle a fixed structure in convenient association with the rotary steering wheel of the vehicle the said structure comprising conductors in the form of a ring and spokes connected together by T-shaped india-rubber housing members through the heads of which the ring extends and through the legs of which the spokes project.

4. An electric switch device, comprising a supporting hub provided with spokes, a ring arranged adjacent to the outer end portions of the spokes, and housings of elastic material inclosing the end portions of the spokes and the adjacent parts of the ring, said housings operating to hold the spokes and ring out of electric contact with each other until a housing is suitably distorted by pressure on the ring.

In testimony whereof I affix my signature.

HARRY PANZETTA.